United States Patent [19]

Alandt

[11] 4,306,581
[45] Dec. 22, 1981

[54] CHEMICAL CONCENTRATION CONTROL SYSTEM FOR FLUID CIRCULATORS

[76] Inventor: George A. Alandt, 22421 Hayes, Taylor, Mich. 48180

[21] Appl. No.: 172,110

[22] Filed: Jul. 25, 1980

[51] Int. Cl.³ .............................................. G05D 11/13
[52] U.S. Cl. ......................................... 137/93; 137/5; 137/563
[58] Field of Search ................ 137/5, 89, 91, 93, 563, 137/599

[56] References Cited

U.S. PATENT DOCUMENTS

| 1,145,509 | 7/1915 | Pike et al. | 137/5 |
| 2,687,139 | 8/1954 | Noble et al. | 137/5 |
| 3,095,121 | 6/1963 | Douty et al. | 137/93 |
| 3,477,467 | 11/1969 | Sewell et al. | 137/599 |
| 3,592,212 | 7/1971 | Schleimer | 137/93 |
| 3,710,811 | 1/1973 | Leverenz et al. | 137/5 |
| 4,016,079 | 4/1977 | Severin | 137/93 |
| 4,033,871 | 7/1977 | Wall | 137/5 |
| 4,224,154 | 9/1980 | Steininger | 137/93 |

*Primary Examiner*—H. Jay Spiegel

*Attorney, Agent, or Firm*—Cullen, Sloman, Cantor, Grauer, Scott & Rutherford

[57] ABSTRACT

In a chemical solution circulator including a tank, a pump with an intake pipe connected to the tank and a discharge pipe for delivering solution to an enclosure communicating with the tank; a chemical concentration control system for the automatic addition of liquid chemicals for maintaining a predetermined concentration thereof within the tank comprises a diverter and chemical additive pipe connected to the discharge pipe for continuously sampling the solution and outletting into the tank. An aspirator is connected into the diverter pipe and has a low pressure additive intake pipe connected to a chemical solution storage tank. A normally closed solenoid valve is interposed in the additive intake pipe. An electronic controller is connected to the valve. A flow through conductivity cell is interposed within the diverter pipe upstream of the aspirator for signaling the controller at a set value maintaining the valve closed. A predetermined reduction of chemical concentration in the solution interrupting the signal of the conductivity cell, the controller automatically energizing and opening the solenoid control valve.

6 Claims, 4 Drawing Figures

CHEMICAL CONCENTRATION CONTROL SYSTEM FOR FLUID CIRCULATORS

BACKGROUND OF THE INVENTION

Heretofore in the use of chemical solution circulators which normally include a tank, a pump with an intake connected to the tank and a discharge pipe for delivering solution to an enclosure communicating with the tank, concentration of the chemicals within the solution is gradually depleted by carryout and makeup water added to the tank. Heretofore it was necessary to shut down the circulator and provide for the addition of such sufficient quantities of concentrated chemical into th solution and to test the solution to bring it up to a predetermined concentration for a particular washing or rinsing problem. Heretofore additive chemicals have been wasted and there has been considerable time delay is shutting down a circulating system for the purpose of adding chemicals to return the solution to a predetermined chemical concentration. Heretofore it has been recognized that in order to maintain uniform chemical concentrations and for providing improved and uniform cleaning or washing chemical concentration control is needed by someone for maintaining of health and safety factors involved in the manual dispensing of chemical additives. Efforts have been made to do this automatically.

THE PRIOR ART

The patents shown venturing mixing pumps in combination with a conductivity probe responsive to solution concentration includes:
Leverenz et al U.S. Pat. No. 3,710,811;
Leverenz et al U.S. Pat. No. 3,827,450;
Wallace U.S. Pat. No. 2,289,611.

In Leverenz '811, although this is a recirculating system, it places a Venturi mixing aspirator upstream from the conductivity probe as is required in a flow-through system. Such flowthrough system is also shown in Wallace.
Wall, U.S. Pat. No. 4,033,871

Here the solution addition occurs downstream (See FIG. 4) from a probe in a recirculating system.

A patent suggesting variable resisters in the circuitry including an intermediate probe and a solenoid are:
Jones, U.S. Pat. No. 3,162,207;
Pike et al U.S. Pat. No. 1,145,509;

Patents showing a conductivity probe control with recirculating cleaning baths are disclosed in:
Hodgens, U.S. Pat. No. 2,748,790;
Nobel et al U.S. Pat. No. 2,687,139;

The following patents are of general interest and at least related to the present subject matter:
Osborne, et al U.S. Pat. No. 2,965,443;
Simsohn, U.S. Pat. No. 1,388,613;
Pecker et al U.S. Pat. No. 3,601,255;
Pellerin et al U.S. Pat. No. 2,874,714;
Willock, U.S. Pat. No. 3,406,826;
Serfass et al U.S. Pat. No. 3,508,656.

The foregoing patents were found as a result of a search of the Patent and Tradmark Office records conducted in Class 137, Subclass 5.

SUMMARY OF THE INVENTION

An important feature of the present invention is to provide a chemical concentration control system for use in conjunction with a closed chemical solution circulator which includes a solution tank, a power operated pump with an intake pipe connected to the tank and a discharge pipe for delivering said solution to an enclosure communicating with the tank.

The control system includes an improved means for providing for an automatic addition of quantities of chemicals from a storage source into the solution for maintaining a predetermined concentration thereof. An important feature includes the use of a diverter and chemical addition pipe which is connected to the discharge pipe to the solution circulator and provides a means of independently sampling the solution in the discharge pipe, independent of the main flow of the solution and outletting into the tank.

A further feature incorporates the use of an aspirator within the diverter pipe having a low pressure intake connected to a source of chemical concentrate and wherein there is interposed within the concentrate intake pipe to the aspirator a normally closed solenoid valve.

A further feature incorporates an electronic controller which is connected to the solenoid valve and under normal conditions maintains the solenoid valve inoperative. A flow-through conductivity cell is interposed in the diverter pipe upstream of the aspirator continuously samples the conductivity and chemical concentration of the solution passing through the diverter pipe and is connected to the electronic controller. The cell provides a signal at a set value on a variable potentiometer within the controller and the controller maintains the solenoid valve inoperative. When the solution is depleted in concentration by carryout and makeup water and the conductivity reduced such signal to the controller is interrupted. This results in the controller automatically activating the solenoid valve and allows concentrate to be drawn from the source into the aspirator and circulated to the solution tank. When the tank solution concentration is restored, the conductivity cell signal is restored to the controller and the solenoid valve is automatically deactivated. This cycle is repeated as necessary.

A further feature of the present invention provides the flow through conductivity cell in the diverter pipe independent of the main discharge flow, continuously sampling limited quantitites of solution as circulated without substantially interferring with the flow through the circulator. There is a constant electronic monitoring of the conductivity of the sampled solution flowing through the diverter pipe, which conductivity is measured by the nature of a signal directed to the electronic controller. During the period of the delivery of such signal from the conductivity cell and wherein there is a sufficient predetermined concentration of chemicals, the electronic controller maintains a solenoid valve inoperative and closed. It is only when the concentration of the chemicals within the system and including the sampling fluid within the diverter pipe has been reduced below that which is predetermined, the signal from the cell to the electronic controller is interrupted and the electronic controller energizes the solenoid valve.

In the present construction, a further feature resides the aspirator is interposed within the diverter pipe independent of the main circulating system and due to the constant flow of sampling fluids therethrough the aspirator is constantly calling for the addition of chemical concentrate from a source subject to the opening of the normally closed solenoid valve.

A further feature is that the diverter pipe has an average diameter which is substantially less than that of the discharge pipe so that the volume of sampling solution flowing through the diverter pipe at any time is appreciably less that the volume of flow through the main discharge pipe.

As a further feature there is incorporated into the diverter pipe upstream of the aspirator a normally open shut-off valve in order to permit inspection of the system while the solution circulator is in operation. Another feature incorporates a filtration means in said diverter pipe upstream of the conductivity cell.

A modified form of a chemical concentration control system includes a three way solenoid valve having a inlet, a normally open outlet and a normally closed outlet and wherein a return pipe interconnects the normally open outlet with the tank for receiving the flow of sampling fluid through the three way valve. The aspirator is interposed within a chemical additive pipe which interconnects the normally closed outlet of the valve with the tank. Said aspirator has a low pressure additive intake pipe connected to a source of chemical concentrate. Upon such reduction of the concentration of chemicals within the solution, the sampling diverting pipe flow through conductivity cell will so activate the electronic controller connected with the three way solenoid valve such that the normally open outlet is closed and the normally closed outlet has been opened to provide for the introduction of additional chemical concentrate from the source through the aspirator and into the solution tank.

A further feature incorporates a modified control system wherein the diverter pipe has therein an aspirator having a low pressure intake pipe connected to a source of chemical concentrate, adapted for delivery to the tank and wherein there is provided a normally closed solenoid valve within the diverter pipe upstream of the aspirator and under the control of the above described electronic controller. There is a normally open bleed line interconnecting the diverter pipe upstream of the solenoid valve with the tank. The flow through conductivity cell is interposed in the discharge pipe and responsive to conductivity and concentration of chemicals within the main line and connected to the electronic controller.

These and other features will be seen from the following specification and claims in conjunction with the appended drawings.

THE DRAWINGS

It will be understood that the above drawings illustrate merely several preferred embodiments of the invention, and that other embodiments are contemplated within the scope of the claims hereafter set forth.

DETAILED DESCRIPTION OF AN EMBODIMENT OF THE INVENTION

Figure 1:
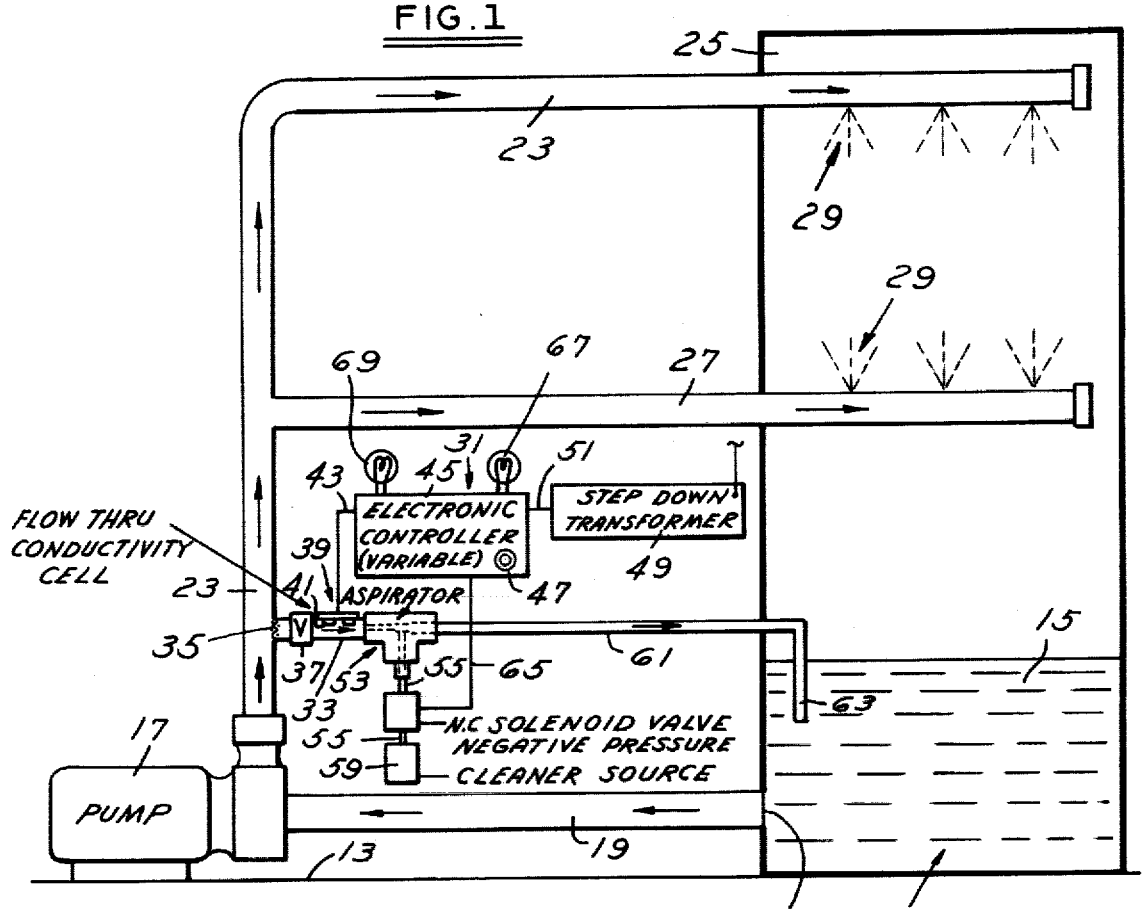
FIG. 1 is a schematic view of a closed chemical solution circulator and incorporating the present chemical concentration control apertures.
Figure 2:
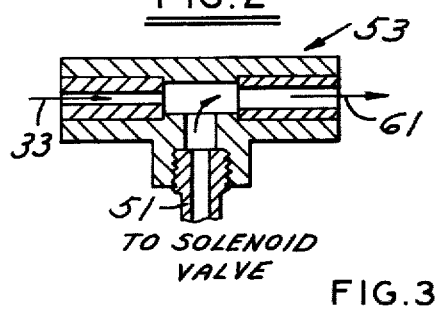
FIG. 2 is a longitudinal section of the aspirator shown in FIG. 1, on an increased scale.

Referring to the drawing and particularly FIGS. 1 and 2 there is shown in FIG. 1 a closed chemical solution circulator having a wash tank or solution tank 11 upon some suitable support or floor 13 and receiving a quantity of a solution including chemicals having a predetermined concentration for a particular washing or rinsing or other material treating system.

The chemical solution circulator includes a power operated pump 17 having an intake pipe 19 connected into the wash tank 11. Connected to the pump is discharge pipe 23 which extends to the upper portion of the enclosure 25. A branch discharge pipe 27 is connected to discharge pipe 23 and extends into the enclosure 25. Both of the pipes 23 and 27 within said enclosure have a series of longitudinally spaced spray outlets 29 to deliver of liquids for washing or spraying onto a workpiece or the like. Fluids within said enclosure are in communication with and in the illustrative embodiment above the wash tank 11.

It is for a closed chemical solution circulator such as shown in FIG. 1 that there is provided a chemical concentration control system or apparatus, generally indicated at 31, for the automatic addition of quantities of chemicals from a source for maintaining a predetermined concentration thereof within the solution circulator. The control system includes the elongated diverter pipe 33 of a reduced diameter relative to the diameter of the discharge pipe 23 for diverting therethrough a low volume of fluid for continuously sampling the solution in said discharge pipe and for outletting thereof into the tank as schematically shown at 63 well below the level of the liquids 15 therein.

In the illustrative embodiment there is preferably provided within the diverter pipe a conventional filter 35 and downstream thereof a shut-off valve 37 by which flow of sampling fluids to the diverter pipe 61 may be interrupted without interrupting the operation of the circulating mechanism.

Interposed within the diverter pipe adjacent the discharge pipe 23 there is provided a flow-through conductivity cell schematically shown at 39 and which includes probes 41 projecting therefrom and into the sampling fluid which is continuously passing through diverter pipe 33, 61.

Electrical lead 43 interconnects the flow-through conductivity cell with the variable electronic controller 45 schematically shown in FIG. 1. The electronic controller has a variable potentiometer therein which includes hand control knob 47.

A suitable step down transformer 49 connected to a power source is provided for delivering through the lead 51 suitable low voltage power, as for example 24 volts, to said controller. An aspirator 53 having a fluid intake and outlet is connected into the diverter pipe, as has a low pressure additive intake pipe 55 depending therefrom. Interposed in said low pressure intake pipe is a normally closed solenoid valve 57, the valve being connected through said low pressure intake pipe to a chemical concentrate storage source or tank 59.

As shown in the drawing, a portion of the diverter pipe designated as a return pipe 61 is of reduced diameter relative to a portion of the diverter pipe 33 and the corresponding discharge pipe 23. Actually the return pipe 61 forms a part of the diverter pipe and has at its end an elbow terminating in an outlet 63 arranged well below the surface of the chemical solution 15 within tank 11. This is for the purpose of assuring an air tight seal relative to the aspirator 53 connected into the diverter pipe 33-61. Leadwire 65 interconnects the electronic controller and the normally closed solenoid valve 57, and under the operation of the electronic controller will energize said valve opening same depending upon functioning of the flow-through conductivity cell 39.

The controller 45 has a feed light 67 which is energized at the same time normally closed solenoid valve 57 is energized and accordingly, most of the time, except when chemicals are added into the solution, the light 67 is not energized. The electronic controller also includes a cell operating light 69 indicating when energized that the flow through conductivity cell 39 is functioning and providing a continuous signal to the electronic controller and the variable potentiometer therein.

In accordance with the illustration shown in FIG. 1, some of the pumped solution in the circulator is diverted from the pump and through the diverter pipe 33-61 and returned to the solution tank 11. The conductivity cell is constantly signaling the controller at a set value on the variable potentiometer 47 within the controller. The aspirator 53 constantly calls for concentrate chemical from the source or tank 59 but is restricted by the normally closed solenoid valve 57.

As the solution is depleted by carryout and makeup water additions to the tank 11, the conductivity cell signal to the controller is interrupted, and the controller activates and opens the solenoid valve 57 causing concentrate to be drawn from the source into the aspirator through the low pressure concentrate intake pipe 55, through diverter return pipe 61 to tank 11.

When the tank solution concentration is restored by the addition of concentrate chemicals from the source 59, the conductivity cell signal as it samples the diverted solution through the diverter pipe 33-61 is restored to the controller and the solenoid valve 51 is deactivated and automatically closed. This cycle is repeated from time to time as necessary and in an automatic manner.

Of importance in the present disclosure as compared with the prior art, the sampling of the chemical solution and its concentration and accordingly, its conductivity is measured from the sampling flow through the diverter pipe 33-61. This diverter pipe thus delivers a low volume flow of sampling solution, as contrasted with the relatively larger flow of solution through the discharge pipe 23.

By the present construction, the aspirator is continually energized by the continuous flow of the sampling solution through the diverter pipe, and is through its low pressure intake pipe 55, which may be of flexible plastic material, is calling for the addition of chemical concentrate from the chemical source 59. This is interrupted by the normally enclosed solenoid valve 57. A decrease in the concentration from what has been predetermined causes an interruption of the conductivity signal from the flow-through conductivity cell 39 and lead 43 to the electronic controller 45. This results in turning on the light 67 and at the same time energizing, through lead 65, the normally closed solenoid valve 57. Thus there is an automatic addition of the chemical concentrate into the circulating system until the concentration thereof and the corresponding conductivity is raised to such point that the flowthrough cell is again active for providing a signal to the electronic controller.

MODIFIED CONTROL SYSTEM

Figure 3:
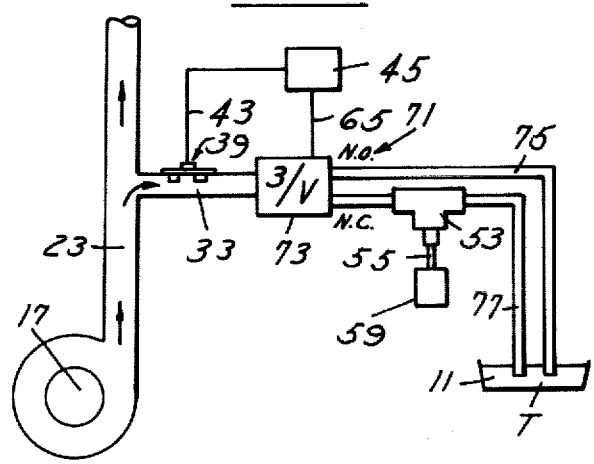
FIG. 3 is a schematic view of a modified chemical concentration control system adapted for incorporation into the circulator of FIG. 1.

A modified concentrate control system is schematically shown in FIG. 3 adapted for incorporation into the closed chemical solution circulator shown in FIG. 1. In place of the normally solenoid valve 51 of FIG. 1, there is incorporated a three way solenoid 73 having its inlet connected to the diverter pipe 33. The three way valve has normally a open outlet and a normally closed outlet shown in FIG. 3. The return pipe 75 is interposed between the normally open outlet of the valve and the fluid within tank 11. A chemical delivery pipe 77 extends between the normally closed outlet of said valve and solution 15 within tank 11.

In this illustration the aspirator 53, of the same construction as above described, having an intake and outlet is interposed within the delivery pipe 77 so that when the solenoid control 3 way valve 73 is activated connections therein are reversed so that flow through return pipe 75 is cut-off and flow-through the chemical delivery pipe 77 is effected.

This flow on activation by the electronic controller 45 operates the aspirator 53 in the same manner as above described so that its intake 55 under low pressure and in communication with the source tank 59 automatically delivers quantities of chemical concentrate from said source and through the conduit 77 to tank 11.

In this construction the flow-through conductivity cell 39 is interposed within the diverter pipe 33 and upstream of the solenoid control three way valve 73. Therefore in operation and with the flow-through conductivity cell responding to a predetermined concentration and conductivity of the sampling solution in the diverter pipe 33, the three way valve remains in such condition that the flow of sampling fluid through the three way valve is continuous to the return pipe 75 and back to the tank 11. Just as soon as the flow through conductivity cell responds to a decreased concentration and conductivity within the sampling solution cutting off its signal through the lead 43 to the controller, the controller activates and reverses the solenoid three way valve 73. This causes addition of concentrate chemicals from the source through the aspirator 53 and pipe 77 to the tank 11.

MODIFICATION

Figure 4:
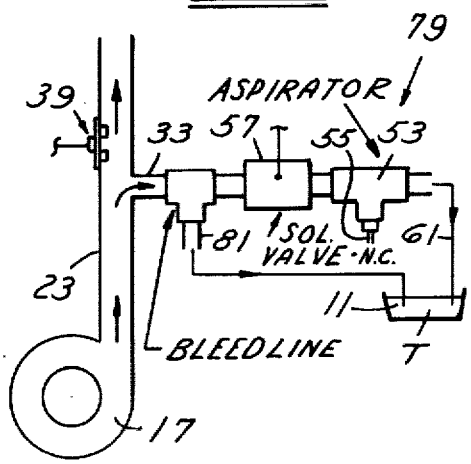
FIG. 4 is a further modified chemical concentration control system adapted for incorporation into the chemical solution circulator shown in FIG. 1.

Modified control system 79 is shown schematically in FIG. 4 and also is adapted for incorporation into the closed chemical solution circulator shown in FIG. 1.

In this construction there is still provided diverter pipe 33 which extends from the discharge pipe 23 and returns to the fluid within the tank 11 in the same manner as shown in FIG. 1.

Interposed within the diverter pipe 33 is aspirator 53 of the same construction as above described and which is connected directly to the source or tank of chemical concentrate by a conduit 55 the same as above described.

Also incorporated within is diverter pipe 33 and upstream of aspirator 53 is a normally closed solenoid valve 57 normally blocking flow of sampling fluid through diverter pipe 33. At such time sampling fluid passig into the diverter pipe flows through the bleed line 81 back to the tank 11.

In this construction, the flow-through conductivity cell is not interposed in the diverter pipe 33 but is connected into the discharge pipe 23 downstream of the diverter pipe and is responsive to the concentration of chemicals within the main solution for reading the conductivity thereof and for providing a suitable signal to the electronic controller 45. On such reduction of concentration of chemical such as would require the addition of chemicals for maintaining a predetermined concentration the flow-through conductivity cell 39 interrupts its signal to the electronic controller 45. The controller 45 automatically energizes the normally closed solenoid valve 57. Thus the sampling fluid through the diverter pipe 33 advances through the solenoid valve and through the aspirator communicates a low pressure to intake 55 such as to deliver additional quantities of chemical concentrate from the source into the tank 11. This continues until the concentration in pipe 23 returns to normal, at which time the flow-through conductivity cell reactivates its signal to the electronic controller 45 and the solenoid control valve 57 is deactivated and the flow therethrough stopped.

For calibrating the control system such as illustratively described with respect to FIG. 1, the washer or chemical solution circulator is first charged to the desired concentration for a particular washing or rinsing job. The enclosure 25 in the illustrative embodiment is shown directly above tank 11. It is contemplated that it would be sufficient that the drainage of liquids from the enclosure be in communication with tank 11 and not necessarily directly there above as is shown. The washer or circulator is run for a predetermined interval such as 10 minutes for example to insure a complete solution of the chemicals added into the circulator system.

At that time the control switch within the electronic controller is turned "on" providing power thereto from the step down transformer 49 and lead 51. At that time, the variable resistor knob 47 is turned clockwise until the feed light 67 comes "on" and the solenoid valve 57 is energized. This means that the concentrate within the source 59 would be sucked into the feed tube 55 of the aspirator and thence through the diverter pipe 33-61 back to the tank. Thereafter the variable resistor knob 45 is turned counter-clockwise just sufficient to turn off the feed light 67 at the same time de-energize the solenoid valve 57.

The metering system is now caliberated at the proper concentration and will maintain automatically this concentration at such level.

In common with the various types of control systems shown in FIGS. 1, 3 and 4, the flow of sampling fluids through the diverter pipe 33 is continuous at all times during the operation of the chemical solution circulator, unless the shut-off valve 37 is closed. In all cases the aspirator is interposed in or connected to the diverter pipe 33 receiving sampling fluid therefrom as in FIG. 1. In FIG. 3 when a three way solenoid control valve has been energized to provide flow through the chemical delivery pipe 77, and in FIG. 4 the sampling fluid within diverter pipe 33 passes through the normally closed solenoid valve 57 under the control of electronic controller 45.

The foregoing control systems provide for substantial liquid chemical saving and quality improvement of washers or circulators of this type, and including alkaline washers, iron phosphate and ammonia washers. Varying conductances of different liquid chemicals are compensated for by the variable potentiometer 47 within the electronic controller 45, the concentration being controlled by the variable poteniometer 47. The initial chemical fill along with the operation of the present solution circulator is accomplished by the chemical concentrate being automatically aspirated from the chemical source 59 into the solution tank. This would occur at any time when the chemical concentration and accordingly, the conductivity of the sampling liquid is below the predetermined standard for a particular washing or rinsing solution.

One primary objective of the present control system is to reduce chemical usage but to maintain uniform chemical concentration and to improve substrate quality of parts subjected to the chemical solution circulator. The amount of chemicals used is reduced. There is automatically maintained a uniform chemical concentration within the tank to result an improved uniform cleaning and phosphating, etc. There is improved chemical concentration control which is automatic. Quality control inspections are limited or entirely eliminated. Health and safety factors are improved due to the elimination of any manual application of the concentrated chemicals into the solution.

Having described my invention, reference should now be had to the following claims.

I claim:

1. In a closed chemical solution circulator including a solution tank, a power operated pump with an intake pipe connected to said tank and a discharge pipe for delivering said solution into an enclosure communicating with said tank;

a chemical concentration control system for the automatic addition of quantities of a chemical for maintaining a predetermined concentration thereof within said tank comprising:

a diverter and chemical addition pipe connected to said discharge pipe for continuously sampling the solution in said discharge pipe and thereafter disrecting same into said tank;

an aspirator having a fluid inlet and outlet connected into said diverter pipe and having a vacuum additive intake pipe;

a chemical concentrate storage source connected to said vacuum additive intake pipe ;

a normally closed solenoid valve interposed into said vacuum additive intake pipe between said aspirator and said chemical concentrate storage source;

an electronic controller connected to said solenoid valve;

and a flow-through conductivity cell interposed within said diverter and chemical addition pipe upstream of said aspirator responding to a predetermined chemical concentration of the sampling fluid in said diverter pipe and connected to said electronic controller for signaling said electronic controller at a set value without energizing said solenoid valve; said conductivity cell including probes projected into the sampling liquid within said diverter pipe and monitoring the conductivity thereof;

a predetermined reduction of said chemical concentration in said diverter pipe interrupting said signal;

said controller automatically energizing and opening said solenoid valve responsive to said signal interruption thereby allowing said chemical concentrate to be drawn form said source into said aspirator and circulated to said solution tank;

the average diameter of said diverter pipe being less than said discharge pipe so that the volume of sampling solution flowing through said diverter pipe at any time is appreciably less than the volume of flow through said discharge pipe;

the flow through said diverter pipe being continuous so that said aspirator is continuously calling for the chemical concentrate;

the restoration of said predetermined chemical concentration reactivating the signal of said conductivity cell to said controller and automatically closing said solenoid valve thereby completing the cycle of replenishment.

2. In the chemical concentration control system of claim 1, said electronic controller including a variable potentiometer adjusted to a set value for said pre-determined concentration, the depletion of said chemical concentration within the sampling liquid and resulting reduction of electrical conductivity interrupting the signal of the conductivity cell to said controller.

3. In the chemical concentration control system of claim 2, said controller having a variable resister knob connected to said potentiometer;

and a feed light connected to said controller energized when said solenoid valve is energized, calibration of said system including rotation of said knob in one direction until a feed light and solenoid valve are de-energized.

4. In the chemical concentration control system of claim 1, said diverter pipe discharging into said solution tank substantially below the surface of the solution therein.

5. In the chemical concentration control system of claim 1, a normally open shut-off valve in said diverter pipe upstream of said conductivity cell, to permit inspection of the system while the solution circulator is in operation and running.

6. In the chemical concentration control system of claim 1, a filter means in said diverter pipe upstream of said conductivity cell.

* * * * *